(12) United States Patent
Imai

(10) Patent No.: US 7,834,324 B2
(45) Date of Patent: Nov. 16, 2010

(54) RADIATION IMAGE DETECTOR

(75) Inventor: Shinji Imai, Ashigarakami-gun (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 12/113,317

(22) Filed: May 1, 2008

(65) Prior Publication Data
US 2008/0272320 A1  Nov. 6, 2008

(30) Foreign Application Priority Data
May 1, 2007  (JP) ............................. 2007-120577

(51) Int. Cl.
*G01T 1/24* (2006.01)

(52) U.S. Cl. ............................. 250/370.14; 250/370.08; 250/370.09; 250/370.11; 257/53; 257/428; 257/429; 257/444

(58) Field of Classification Search ............ 250/370.08, 250/370.09, 370.11, 370.14; 257/53, 428, 257/429, 444
See application file for complete search history.

(56) References Cited

U.S. PATENT DOCUMENTS

| | | | |
|---|---|---|---|
| 4,866,332 A * | 9/1989 | Takasaki et al. ............. 313/386 |
| 5,101,255 A * | 3/1992 | Ishioka et al. ................. 257/52 |
| 5,198,673 A * | 3/1993 | Rougeot et al. ........ 250/370.11 |
| 5,880,472 A * | 3/1999 | Polischuk et al. ...... 250/370.09 |
| 6,171,643 B1 | 1/2001 | Polischuk et al. |
| 6,953,945 B2 * | 10/2005 | Imai ............................ 250/591 |
| 2006/0054835 A1 * | 3/2006 | Rowlands et al. ........... 250/371 |
| 2007/0108398 A1 * | 5/2007 | Imai ............................ 250/580 |
| 2008/0224055 A1 * | 9/2008 | Nariyuki ................ 250/370.08 |
| 2008/0283947 A1 * | 11/2008 | Imai ............................ 257/428 |

FOREIGN PATENT DOCUMENTS

JP  9-036341 A  2/1997
JP  3774492 B2  2/2006

* cited by examiner

*Primary Examiner*—David P Porta
*Assistant Examiner*—Casey Bryant
(74) *Attorney, Agent, or Firm*—Sughrue Mion, PLLC

(57) ABSTRACT

An intermediate layer is located between a recording photoconductive layer and an electrode, which is either one of a bias electrode and a reference electrode, and which is located on the side at positive electric potential with respect to a charge accumulating section at the time of readout of electric charges of the charge accumulating section. The intermediate layer is an a-Se layer containing, as a specific substance, at least one kind of substance selected from the group consisting of an alkali metal fluoride, an alkaline earth metal fluoride, an alkali metal oxide, an alkaline earth metal oxide, $SiO_x$, and $GeO_x$, where x represents a number satisfying $0.5 \leq x \leq 1.5$, in a concentration falling within the range of 0.003 mol % to 0.03 mol %.

6 Claims, 5 Drawing Sheets

RADIATION IMAGE DETECTOR

BACKGROUND OF THE INVENTION

1. Field of the Invention

This invention relates to a radiation image detector adapted for use in a radiation imaging apparatus, such as an X-ray imaging apparatus.

2. Description of the Related Art

With respect to radiation imaging operations for medical diagnoses, there have heretofore been known radiation imaging apparatuses, in which radiation image detectors (utilizing semiconductors as principal sections) are utilized for detecting radiation and converting the radiation into an electric signal. Ordinarily, the radiation image detectors may be classified into a direct conversion type, wherein the radiation is directly converted into electric charges, and wherein the thus formed electric charges are accumulated; and an indirect conversion type, wherein the radiation is converted into light by use of a scintillator, such as CsI:Tl or GOS ($Gd_2O_2S$:Tb), wherein the thus obtained light is then converted into electric charges by use of a photoconductive layer, and wherein the thus formed electric charges are accumulated. Also, in accordance with read-out techniques, the radiation image detectors may be classified into an optical read-out technique, wherein the electric charges having been generated with the irradiation of the radiation are accumulated at a charge accumulating section, and wherein the accumulated electric charges are read out by the utilization of a semiconductor material capable of generating the electric charges when being exposed to light; and a TFT technique, wherein the electric charges having been generated with the irradiation of the radiation are accumulated at accumulating capacitors, and wherein the accumulated electric charges are read out through an operation, in which an electric switch, such as a thin film transistor (TFT), is turned on and off with respect to each of pixels.

The direct conversion types of the radiation image detectors are constituted for performing a radiation detecting operation, wherein a predetermined bias voltage is applied across a bias electrode, which has been formed on a surface of a radiation-sensitive semiconductor film (acting as a recording photoconductive layer), and a reference electrode, which has been formed on a base plate, wherein the electric charges having been generated with the irradiation of the radiation are collected by a charge collecting electrode, which been formed on an opposite surface of the semiconductor film, and wherein the collected electric charges are taken out as a radiation detection signal. Ordinarily, the recording photoconductive layer is formed with amorphous selenium (a-Se) for its advantages of a high dark resistance and a high response speed.

Ordinarily, from the view point of environmental stability, as the material of the electrode described above, a metal material having a large work function (of, approximately, 5 eV), such as Pt or Pd, is employed. The work function of a-Se is equal to approximately 5.8 eV, and the difference between the work function of a-Se and the work function of the material of the electrode described above is thus small. Therefore, in cases where the electrode is formed on a-Se, and a bias voltage for yielding a positive potential is applied, a dark current arises due to holes having been injected from the electrode to a-Se by being assisted by the electric field. After the holes have once been injected, the surplus holes contribute to a large dark current, which markedly exceeds a high specific resistance of a-Se.

Therefore, ordinarily, radiation image detectors are provided with a hole capture layer. For example, in U.S. Pat. Nos. 5,880,472 and 6,171,643, there is described a technique, wherein an a-Se layer having been doped with Na (which is one of alkali metals) is provided as a hole capture layer (having a thickness falling within the range of 0.5 μm to 10 μm) for capturing the holes, which have been injected from an electrode on the positive bias application side into a photoelectric conversion layer, and for reducing a dark current.

Also, for example, in Japanese Patent No. 3774492, there is described a technique, wherein an a-Se layer having been doped with $CaF_2$ (concentration: falling within the range of 0.05% to 0.5%, film thickness: falling within the range of 0.05 μm to 1 μm), $LiF_2$ (concentration: falling within the range of 0.05% to 10%, film thickness: falling within the range of 0.05 μm to 1 μm), or LiF (concentration: falling within the range of 0.05% to 0.5%, film thickness: falling within the range of 0.05 μm to 1 μm) is provided as a hole capture layer for capturing the holes, which have been injected from an electrode on the positive bias application side into a photoelectric conversion layer, and for reducing a dark current. Further, it is described that, as the dopants to be used in the hole capture layer, besides $CaF_2$ (which is one of alkaline earth metal fluorides), LiF, and $LiF_2$ (which is one of alkali metal fluorides) described above, metal elements, such as Li, Na, K, Mg, Ca, Ba, and Tl, are equally efficient.

With the hole capture layer described in U.S. Pat. Nos. 5,880,472 and 6,171,643, though the initial electric characteristics (the dark current characteristics) are capable of being satisfied, it is not always possible to keep the electric characteristics (the dark current characteristics and the defect characteristics) over a long period of time. It is presumably since the alkali metal is apt to diffuse in a-Se, the distribution of the doping concentration alters with the passage of time, the alkali metal acting as the doping substance migrates to an a-Se interface, and crystallization is thus apt to occur.

With the hole capture layer described in Japanese Patent No. 3774492, the initial electric characteristics (the dark current characteristics: at a stage during voltage application or at a stage immediately after voltage short-circuiting) are capable of being satisfied. However, in cases where the compound dopant, such as $CaF_2$, LiF, or $LiF_2$, which is employed in Japanese Patent No. 3774492, is doped in a molar concentration falling within the range of 0.05% to 10%, it is not always possible to keep the quality (the defect characteristics) over a long period of time.

It has been found that the problems described above are encountered for the reasons described below. Specifically, with the doping technique, wherein an alloy raw material, which is constituted of a mixture of an Se raw material and the compound dopant, is utilized as the deposition raw material, since a melting temperature of the compound dopant described above is ordinarily as high as at least 800° C., the efficiency with which the compound dopant is doped into a vacuum deposited film is not capable of being kept high. Therefore, it is necessary to utilize a co-vacuum evaporation technique, wherein the compound dopant described above is doped by use of the vacuum evaporation from a hearth different from the hearth for the Se raw material. With the co-vacuum evaporation technique, the defects, such as crystallization nucleuses, are apt to be introduced into the a-Se film acting as the matrix of the hole capture layer.

SUMMARY OF THE INVENTION

The primary object of the present invention is to provide a radiation image detector, which is constituted such that, in cases where doping processing is performed with a co-vacuum evaporation technique, thermal damage to an a-Se film acting as a matrix is capable of being suppressed, and electric characteristics (dark current characteristics and defect characteristics) are capable of being kept over a long period of time.

The present invention provides a radiation image detector, comprising:

i) a bias electrode, which has transmissivity with respect to a recording electromagnetic wave carrying image information, ii) a recording photoconductive layer, which contains a-Se as a principal constituent, and which is capable of generating electric charges when the recording electromagnetic wave having passed through the bias electrode is irradiated to the recording photoconductive layer, iii) a charge accumulating section, which accumulates the generated electric charges, iv) a reference electrode constituted of a plurality of electrodes, and v) a base plate, the bias electrode, the recording photoconductive layer, the charge accumulating section, the reference electrode, and the base plate being overlaid in this order, wherein the improvement comprises the provision of an intermediate layer between the recording photoconductive layer and the electrode, which is either one of the bias electrode and the reference electrode, and which is located on the side at positive electric potential with respect to the charge accumulating section at the time of readout of the electric charges of the charge accumulating section, the intermediate layer being an a-Se layer containing, as a specific substance, at least one kind of substance selected from the group consisting of an alkali metal fluoride, an alkaline earth metal fluoride, an alkali metal oxide, an alkaline earth metal oxide, $SiO_x$, and $GeO_x$, where x represents a number satisfying $0.5 \leq x \leq 1.5$, a concentration of the specific substance falling within the range of 0.003 mol % to 0.03 mol %.

In the radiation image detector in accordance with the present invention, x of each of $SiO_x$ and $GeO_x$ should preferably be equal to 1.

The radiation image detector in accordance with the present invention should preferably be modified such that the intermediate layer has a layer thickness falling within the range of 2 μm to 20 μm.

Also, the radiation image detector in accordance with the present invention should preferably be modified such that the concentration of the specific substance in at least one interface region of the intermediate layer lowers at a rate of at most 1.5 orders of ten/1 μm toward the interface.

Further, the radiation image detector in accordance with the present invention should preferably be modified such that a hole blocking layer is located between the intermediate layer and the electrode, which is located on the side at the positive electric potential. In such cases, the radiation image detector in accordance with the present invention should more preferably be modified such that a crystallization preventing layer is located between the intermediate layer and the hole blocking layer.

The radiation image detector in accordance with the present invention comprises:

i) the bias electrode, which has the transmissivity with respect to the recording electromagnetic wave carrying the image information, ii) the recording photoconductive layer, which contains a-Se as the principal constituent, and which is capable of generating the electric charges when the recording electromagnetic wave having passed through the bias electrode is irradiated to the recording photoconductive layer, iii) the charge accumulating section, which accumulates the generated electric charges, iv) the reference electrode constituted of the plurality of the electrodes, and v) the base plate, the bias electrode, the recording photoconductive layer, the charge accumulating section, the reference electrode, and the base plate being overlaid in this order, wherein the improvement comprises the provision of the intermediate layer between the recording photoconductive layer and the electrode, which is either one of the bias electrode and the reference electrode, and which is located on the side at the positive electric potential with respect to the charge accumulating section at the time of the readout of the electric charges of the charge accumulating section, the intermediate layer being the a-Se layer containing, as the specific substance, at least one kind of substance selected from the group consisting of the alkali metal fluoride, the alkaline earth metal fluoride, the alkali metal oxide, the alkaline earth metal oxide, $SiO_x$, and $GeO_x$, where x represents a number satisfying $0.5 \leq x \leq 1.5$, the concentration of the specific substance falling within the range of 0.003 mol % to 0.03 mol %.

Therefore, with the radiation image detector in accordance with the present invention, the electric characteristics are capable of being kept over a long period of time.

Particularly, with the radiation image detector in accordance with the present invention, wherein the intermediate layer has the layer thickness falling within the range of 2 μm to 20 μm, even though the concentration of the specific substance in the intermediate layer is low, the hole capture is capable of being performed sufficiently. Therefore, in such cases, the dark current is capable of being suppressed, and at the same time the sensitivity is capable of being kept high.

Also, with the radiation image detector in accordance with the present invention, wherein the concentration of the specific substance in at least one interface region of the intermediate layer lowers at a rate of at most 1.5 orders of ten/1 μm toward the interface, the crystallization of the specific substance at the interface is capable of being suppressed efficiently. Therefore, in such cases, the electric characteristics are capable of being kept over a markedly long period of time.

Further, with the radiation image detector in accordance with the present invention, wherein the hole blocking layer is located between the intermediate layer and the electrode, which is located on the side at the positive electric potential, insufficiency of the hole capture capability is capable of being compensated for in cases where the concentration of the specific substance in the intermediate layer is low. Therefore, in such cases, the dark current is capable of being suppressed even further. With the radiation image detector in accordance with the present invention, wherein the hole blocking layer is provided, the radiation image detector, in which thermal damage to a-Se is capable of being kept lower and in which durability is longer, is capable of being obtained than in cases where the concentration of the specific substance in the intermediate layer is increased.

In such cases, the radiation image detector in accordance with the present invention should more preferably be modified such that the crystallization preventing layer is located between the intermediate layer and the hole blocking layer. With the modification described above, thermal damage to the intermediate layer at the time of the overlaying of the hole blocking layer is capable of being suppressed.

DESCRIPTION OF THE PREFERRED EMBODIMENTS

The present invention will hereinbelow be described in further detail with reference to the accompanying drawings.

Ordinarily, the radiation image detectors may be classified into the direct conversion type, wherein the radiation is directly converted into electric charges, and wherein the thus formed electric charges are accumulated; and the indirect conversion type, wherein the radiation is converted into light by use of the scintillator, such as CsI:Tl or GOS ($Gd_2O_2S$: Tb), wherein the thus obtained light is then converted into electric charges by use of a photoconductive layer of a-Se, or the like, and wherein the thus formed electric charges are accumulated. The radiation image detector in accordance with the present invention is capable of being employed for both the direct conversion type of the radiation image detector and the indirect conversion type of the radiation image detector. The radiation image detector in accordance with the present invention may be employed for the radiation, such as X-rays, γ-rays, and α-rays.

The radiation image detector in accordance with the present invention may be employed for both the optical read-out technique and the TFT technique.

Figure 1:
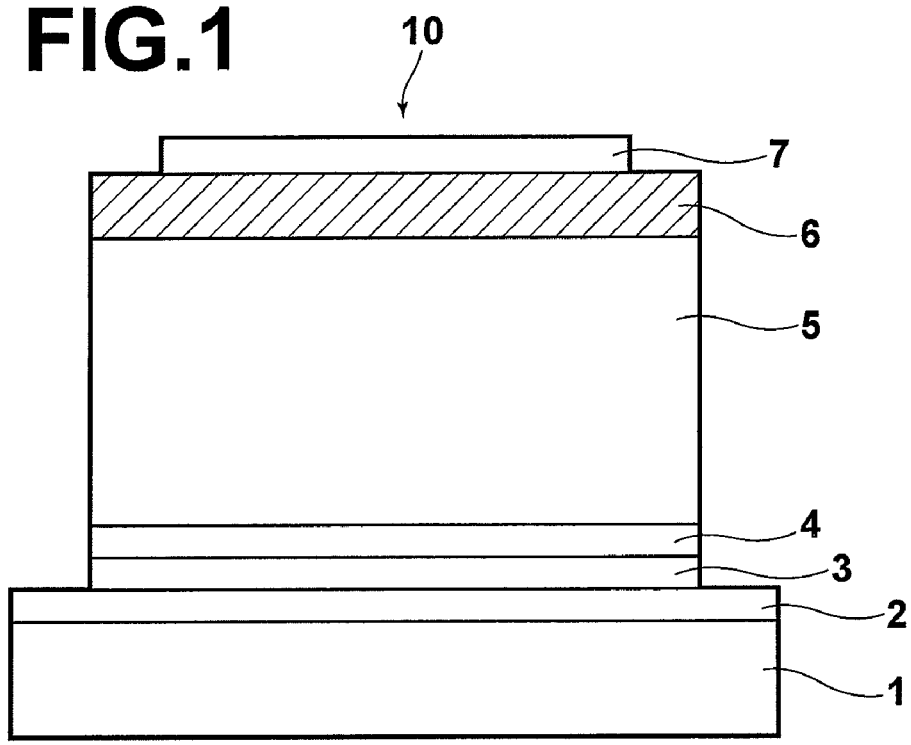
FIG. 1 is a schematic sectional view showing a first embodiment of the radiation image detector in accordance with the present invention.

FIG. 1 is a schematic sectional view showing a first embodiment of the radiation image detector in accordance with the present invention. With reference to FIG. 1, a radiation image detector 10 comprises a base plate 1. The radiation image detector 10 also comprises an active matrix layer 2.

The active matrix layer 2 is provided with a read-out circuit, which is constituted of TFT's. The active matrix layer 2 is also provided with pixel electrodes and accumulating capacitors. The radiation image detector 10 further comprises an electron blocking layer 3. The radiation image detector 10 still further comprises a crystallization preventing layer 4. The radiation image detector 10 also comprises a recording photoconductive layer 5. The radiation image detector 10 further comprises an intermediate layer 6. The radiation image detector 10 still further comprises a bias electrode 7, which has the transmissivity with respect to the recording electromagnetic wave carrying the image information. The active matrix layer 2, the electron blocking layer 3, the crystallization preventing layer 4, the recording photoconductive layer 5, the intermediate layer 6, and the bias electrode 7 are overlaid in this order on the base plate 1.

Figure 5:
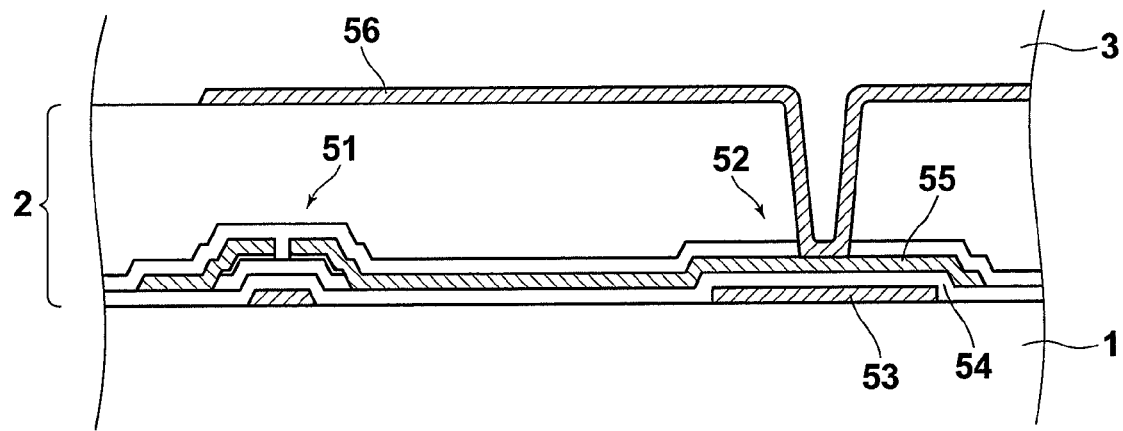
FIG. 5 is an enlarged sectional view showing an active matrix layer.

FIG. 5 is an enlarged sectional view showing an active matrix layer. As illustrated in FIG. 5, the active matrix layer 2 comprises a TFT 51 and an accumulating capacitor 52, which correspond to each of pixels. An output line of each TFT 51 is connected to signal detecting means (not shown). Also, a control line of each TFT 51 is connected to TFT control means (not shown). The accumulating capacitor 52 comprises a bottom electrode 53, an electrical insulating layer 54, a top electrode 55, and a charge collecting electrode 56, which are overlaid in this order on the base plate 1. Of the top electrode 55 of the accumulating capacitor 52, a region of the top electrode 55, which region stands facing the bottom electrode 53, is the region at which the electric charges are induced (accumulated) and which corresponds to the charge accumulating section. Also, the bottom electrode 53 is the electrode, which is to be at reference electric potential with respect to the bias electrode 7. The bottom electrode 53 corresponds to the reference electrode.

The radiation image detector 10 is operated in the manner described below. Specifically, in cases where X-rays are irradiated to the recording photoconductive layer 5 at the time, at which an electric field is being formed across the bias electrode 7 and the reference electrode, pairs of positive and negative charges are generated in the recording photoconductive layer 5, and latent image charges corresponding to the quantity of the pairs of positive and negative charges are accumulated at the charge accumulating section in the active matrix layer 2. In cases where the latent image charges having been accumulated at the charge accumulating section are to be read out, the TFT's 51, 51, . . . of the active matrix layer 2 are actuated successively, and an image signal component, which is formed in accordance with the latent image charges corresponding to each of the pixels, is outputted through the output line. The image signal component is detected by the signal detecting means. The electrostatic latent image, which the latent image charges carry, is thus capable of being read out. (In this case, the electrode, which is located on the side at the positive electric potential with respect to the charge accumulating section at the time of the readout of the electric charges of the charge accumulating section, is the bias electrode 7.)

The bias electrode 7 may be made from one of various materials, which have the transmissivity with respect to the X-rays. By way of example, the bias electrode 7 may be constituted of a thin gold film. The recording photoconductive layer 5 contains a-Se as the principal constituent and may be doped with an alkali metal. The term "principal constituent" as used herein means that the content of the constituent is equal to at least 50%.

The base plate 1 may be made from glass, a polyimide, a polycarbonate, a flexible base plate, which is constituted of a stainless steel metal plate having a thickness of approximately 0.1 mm and an electrical insulating thin film, such as an $SiO_2$ thin film, formed on the stainless steel metal plate. The electron blocking layer 3 acts to block or capture the electrons injected from the pixel electrode into the recording photoconductive layer 5. The electron blocking layer 3 may be constituted of an inorganic material, such as $Sb_2S_3$, $As_2Se_3$, $As_2S_3$, or CdSe; or an organic film, such as a PVK film, or a polycarbonate (PC) film added with hole transporting molecules. The layer thickness of the electron blocking layer 3 should preferably fall within the range of approximately 0.05 μm to approximately 5 μm.

The crystallization preventing layer 4 may be constituted of an a-Se layer, which contains at least one kind of element selected from the group consisting of As, Sb, and Bi in a proportion falling within the range of 3% to 40%, preferably in a proportion falling within the range of 10% to 33%. In such cases, the thickness of the a-Se layer constituting the crystallization preventing layer 4 should preferably fall within the range of 0.05 μm to 0.3 μm. Alternatively, the crystallization preventing layer 4 may be constituted of an organic film, such as a polycarbonate film. With the provision of the crystallization preventing layer 4, the crystallization of the recording photoconductive layer 5 at its interface with respect to the crystallization preventing layer 4 is capable of being suppressed.

The intermediate layer 6 is the a-Se layer containing, as the specific substance, at least one kind of substance selected from the group consisting of the alkali metal fluoride, the alkaline earth metal fluoride, the alkali metal oxide, the alkaline earth metal oxide, $SiO_x$, and $GeO_x$, where x represents a number satisfying $0.5 \leq x \leq 1.5$, preferably x=1, the concentration of the specific substance with respect to a-Se falling within the range of 0.003 mol % to 0.03 mol %. If the concentration of the specific substance is lower than 0.003 mol %, the suppression of the dark current is not capable of being performed. If the concentration of the specific substance is higher than 0.03 mol %, the quality is not always capable of being kept over a long period of time.

The layer thickness of the intermediate layer 6 may be selected appropriately in accordance with the desired quantity of the electric charges captured. The layer thickness of the intermediate layer 6 should preferably fall within the range of 2 μm to 20 μm. In cases where the layer thickness of the intermediate layer 6 is set to be equal to at least 2 μm, even though the concentration of the specific substance in the intermediate layer 6 is equal to approximately 0.003 mol %, a sufficient hole capture function is capable of being obtained. Also, in cases where the layer thickness of the intermediate layer 6 is set to be equal to at most 20 μm, the lowering of the X-ray sensitivity is capable of being suppressed.

If the specific substance contained in the intermediate layer 6 concentrates upon the contact interface with the bias electrode 7 at which the intermediate layer 6 and the bias electrode 7 are in contact with each other, the problems will occur in that crystallization is apt to occur at the interface due to a change with the passage of time. It is considered that the problems described above occur since residual moisture at the interface and the specific substance undergo a reaction with each other, and the alkali metal, the alkaline earth metal, Si, or Ge of the specific substance is isolated. Therefore, the concentration of the specific substance in the interface region of the intermediate layer 6 with respect to the bias electrode 7 should preferably be lowered at a rate of at most 1.5 orders of ten/1 μm toward the interface with the bias electrode 7, and should more preferably be lowered at a rate falling within the range of 0.5 to 1.5 orders of ten/1 μm toward the interface with the bias electrode 7. In such cases, the time required for the specific substance to diffuse through a-Se and to reach the interface region described above becomes long, and the service life is capable of being kept long.

In order for the distribution of the concentration of the specific substance described above to be obtained, it is possible to employ the co-vacuum evaporation technique, wherein the hearth for Se, which acts as the matrix of the intermediate layer 6, and the hearth for the specific substance, which is to be contained in the intermediate layer 6, are located as two independent hearths, and wherein the vacuum evaporation with the hearth for Se and the vacuum evaporation with the hearth for the specific substance are performed simultaneously. For example, the vacuum evaporation rate of Se acting as the matrix may be kept at a predetermined value, and the temperature of the hearth for the specific substance may be adjusted appropriately with respect to time. In this manner, the distribution of the concentration of the specific substance with respect to the layer thickness direction is capable of being adjusted. Also, in cases where a hearth shutter and a base plate shutter are utilized, the boundary of the intermediate layer 6 with respect to the layer thickness direction is capable of being set clearly, and adverse effects upon the function of a different layer (e.g., the crystallization preventing layer 4) adjacent to the intermediate layer 6 are capable of being prevented from occurring.

The top region of the intermediate layer 6, the bottom region of the intermediate layer 6, or the entire region of the intermediate layer 6 may be doped with As, Sb, Bi, or the like, in a proportion within the range such that the hole capture capability may not be lost.

As illustrated in FIG. 1, the intermediate layer 6 should preferably be located such that the intermediate layer 6 may be in direct contact with the recording photoconductive layer 5. Each of the intermediate layer 6 and the recording photoconductive layer 5 contains a-Se as the matrix. The continuity of the bonding of a-Se at the contact interface between the intermediate layer 6 and the recording photoconductive layer 5 is high, and therefore the barrier with respect to the electron movement characteristics is small. Therefore, in cases where the intermediate layer 6 is located such that the intermediate layer 6 may be in direct contact with the recording photoconductive layer 5, the electrons having been generated within the recording photoconductive layer 5 are capable of being swept out without being accumulated at the interface region, at which the recording photoconductive layer 5 and the intermediate layer 6 are in contact with each other.

Each of the electron blocking layer 3, the crystallization preventing layer 4, recording photoconductive layer 5, and the bias electrode 7 is capable of being formed with a known technique, such as a resistance heating vacuum evaporation technique or a co-vacuum evaporation technique.

Figure 2:
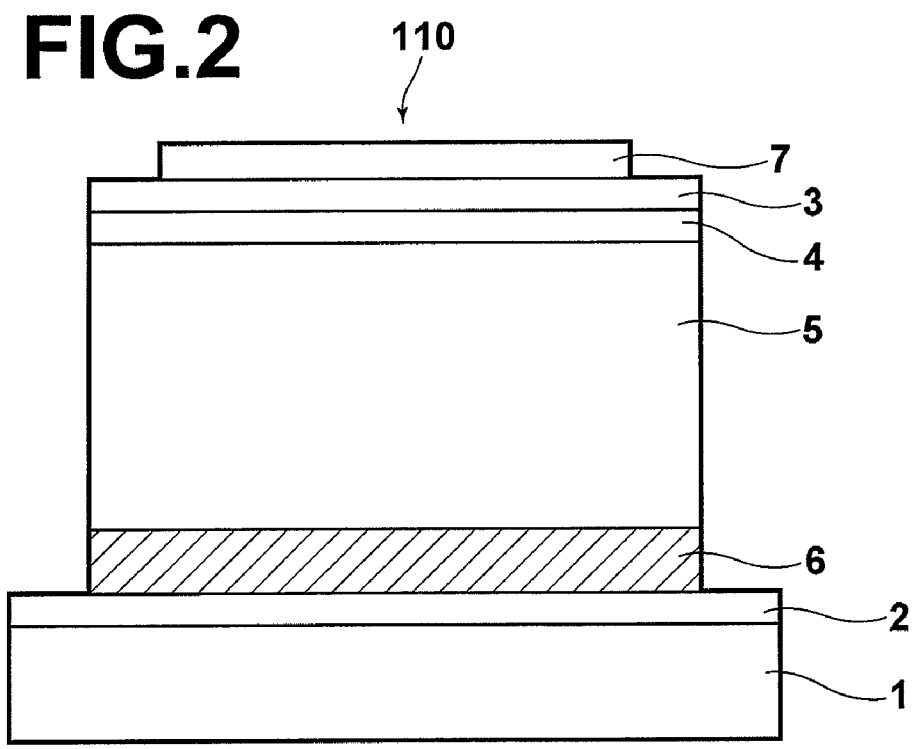
FIG. 2 is a schematic sectional view showing a second embodiment of the radiation image detector in accordance with the present invention.

FIG. 2 is a schematic sectional view showing a second embodiment of the radiation image detector in accordance with the present invention. In FIG. 2 (and in those that follow), similar elements are numbered with the same reference numerals with respect to FIG. 1. With reference to FIG. 2, a radiation image detector 110 comprises the base plate 1. The radiation image detector 110 also comprises the active matrix layer 2. The active matrix layer 2 is provided with the read-out circuit, which is constituted of the TFT's. The active matrix layer 2 is also provided with the pixel electrodes. The radiation image detector 110 further comprises the intermediate layer 6. The radiation image detector 110 still further comprises the recording photoconductive layer 5. The radiation image detector 110 also comprises the crystallization preventing layer 4. The radiation image detector 110 further comprises the electron blocking layer 3. The radiation image detector 110 still further comprises the bias electrode 7, which has the transmissivity with respect to the recording electromagnetic wave carrying the image information. The active matrix layer 2, the intermediate layer 6, the recording photoconductive layer 5, the crystallization preventing layer 4, the electron blocking layer 3, and the bias electrode 7 are overlaid in this order on the base plate 1.

In the second embodiment of the radiation image detector 110 illustrated in FIG. 2, the electrode, which is located on the side at the positive electric potential with respect to the charge accumulating section at the time of the readout of the electric charges of the charge accumulating section, is the active matrix layer 2 provided with the read-out circuit, which is constituted of the TFT's, and the accumulating capacitors. (Specifically, the electrode, which is located on the side at the positive electric potential with respect to the charge accumulating section at the time of the readout of the electric charges of the charge accumulating section, is the reference electrode located within the active matrix layer 2.) Therefore, the intermediate layer 6 is located between the active matrix layer 2 and the recording photoconductive layer 5. Actually, in the cases of the electric read-out technique, the photoconductive layer, such as the a-Se layer, is not located on the side closer to the base plate than the charge collecting electrode. Therefore, in such cases, the intermediate layer 6 is not located between the reference electrode and the charge collecting electrode and is located between the charge collecting electrode and the recording photoconductive layer 5.

Figure 3:
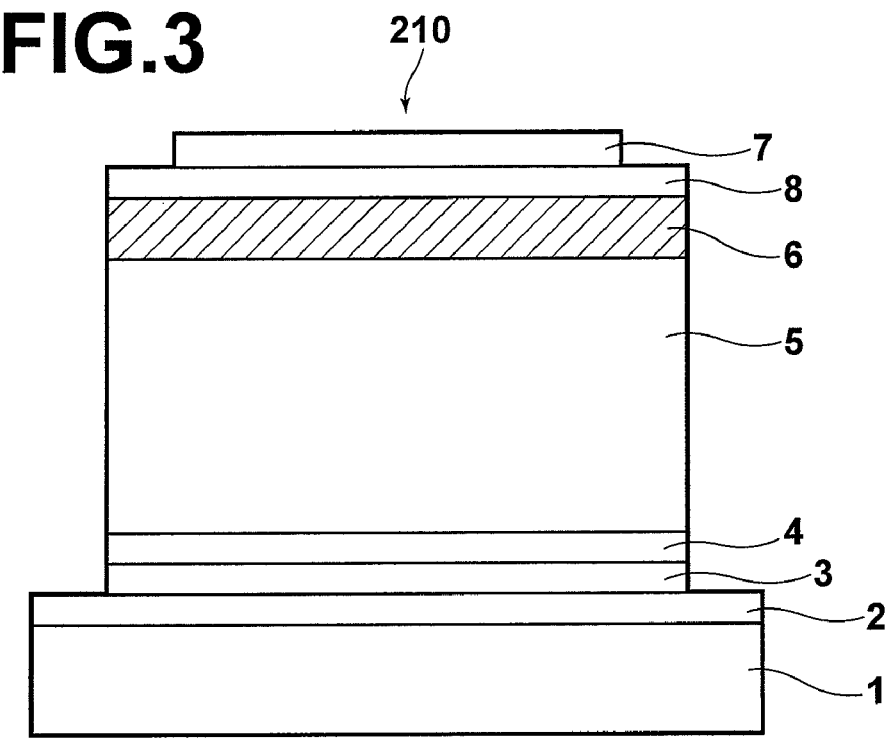
FIG. 3 is a schematic sectional view showing a third embodiment of the radiation image detector in accordance with the present invention.

FIG. 3 is a schematic sectional view showing a third embodiment of the radiation image detector in accordance with the present invention. With reference to FIG. 3, a radiation image detector 210 comprises the base plate 1. The radiation image detector 210 also comprises the active matrix layer 2. The active matrix layer 2 is provided with the read-out circuit, which is constituted of the TFT's. The active matrix layer 2 is also provided with the accumulating capacitors. The radiation image detector 210 further comprises the electron blocking layer 3. The radiation image detector 210 still further comprises the crystallization preventing layer 4. The radiation image detector 210 also comprises the recording photoconductive layer 5. The radiation image detector 210 further comprises the intermediate layer 6. The radiation image detector 210 still further comprises a hole blocking layer 8. The radiation image detector 210 also comprises the bias electrode 7, which has the transmissivity with respect to the recording electromagnetic wave carrying the image information. The active matrix layer 2, the electron blocking layer 3, the crystallization preventing layer 4, the recording photoconductive layer 5, the intermediate layer 6, the hole blocking layer 8, and the bias electrode 7 are overlaid in this order on the base plate 1.

The third embodiment of the radiation image detector 210 illustrated in FIG. 3 is constituted basically in the same manner as that in the first embodiment of the radiation image detector 10 illustrated in FIG. 1, except that the hole blocking layer 8 is located between the intermediate layer 6 and the bias electrode 7, which has the transmissivity with respect to the recording electromagnetic wave carrying the image information.

The hole blocking layer 8 is the layer capable of blocking the holes and transmitting the electrons. The hole blocking layer 8 may be constituted of an inorganic film, such as an $Sb_2S_3$ film or a $CeO_2$ film; or an organic film, such as a PC film having been added with an electron transportable molecule, e.g., trinitrofluorenone (TNF). In cases where the hole blocking layer 8 is constituted of the $Sb_2S_3$ film, the layer thickness of the hole blocking layer 8 may vary in accordance with the $Sb_2S_3$ film forming conditions and should preferably fall within the range of approximately 0.1 μm to approximately 1 μm. It is presumed that the $Sb_2S_3$ film is capable of acting as the hole blocking layer since, principally, the interface with the a-Se layer, which is in contact with the $Sb_2S_3$ film, acts as the electric barrier. Also, the $Sb_2S_3$ film itself has the characteristics possessing localized levels for electron capture. Therefore, in cases where the layer thickness of the $Sb_2S_3$ film is larger than 2 μm, the electrons are not capable of passing through the film, and the $Sb_2S_3$ film becomes inappropriate for the hole blocking layer. Accordingly, in cases where the hole blocking layer 8 is constituted of the $Sb_2S_3$ film, the layer thickness of the hole blocking layer 8 should preferably be at most approximately 1 μm, and should more preferably be at most approximately 0.5 μm. Further, if the film thickness of the $Sb_2S_3$ film is markedly small, film peeling will be apt to occur. Therefore, the film thickness of the $Sb_2S_3$ film should preferably be at least approximately 0.1 μm.

Also, such that the hole blocking function of the $Sb_2S_3$ layer may be enhanced, the material of the bias electrode 7 should preferably be selected from materials (such as Au and Al) having a work function smaller than the work function of $Sb_2S_3$, and an electric potential barrier should preferably be formed at the interface between the $Sb_2S_3$ film and the electrode layer, which is in contact with the $Sb_2S_3$ layer. As described above, in cases where the layer thickness of the $Sb_2S_3$ layer is set to be equal to at most 2 μm, preferably at most 1 μm, more preferably at most 0.5 μm, the characteristics of rectification contact for blocking of hole injection become predominant over the characteristics as the electron blocking layer, and it becomes possible for the $Sb_2S_3$ layer to be used as the hole blocking layer. In cases where the hole blocking layer 8 is constituted of the $CeO_2$ film, the layer thickness of the $CeO_2$ film should preferably fall within the range of approximately 0.0 μm to approximately 0.03 μm. In cases where the hole blocking layer 8 is constituted of the organic film, such as the PC film having been added with the electron transporting molecule, the layer thickness of the organic film should preferably fall within the range of approximately 0.05 μm to approximately 0.3 μm.

As described above, in cases where the hole blocking layer 8 is located between the intermediate layer 6 and the bias electrode 7 (i.e., the electrode, which is located on the side at the positive electric potential with respect to the charge accumulating section at the time of the readout of the electric charges of the charge accumulating section), the insufficiency of the hole capture capability is capable of being compensated for in cases where the concentration of the specific substance in the intermediate layer 6 is low. Therefore, in such cases, the dark current is capable of being suppressed. Accordingly, in cases where the hole blocking layer 8 is provided, the concentration of the specific substance in the intermediate layer is capable of being suppressed to a value falling within the range of approximately 0.003 mol % to approximately 0.03 mol %. With the radiation image detector 210 in accordance with the present invention, wherein the hole blocking layer 8 is provided, the radiation image detector, in which thermal damage is capable of being kept lower and in which durability is longer, is capable of being obtained than in cases where the concentration of the specific substance in the intermediate layer 6 is increased.

Figure 4:
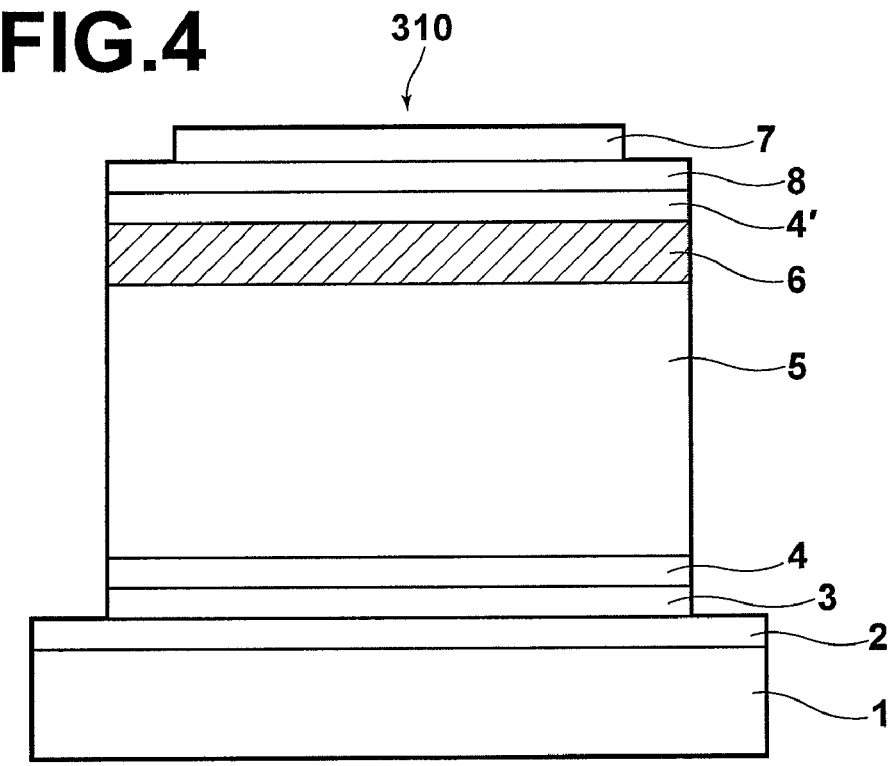
FIG. 4 is a schematic sectional view showing a fourth embodiment of the radiation image detector in accordance with the present invention.

FIG. 4 is a schematic sectional view showing a fourth embodiment of the radiation image detector in accordance with the present invention. With reference to FIG. 4, a radiation image detector 310 comprises the base plate 1. The radiation image detector 310 also comprises the active matrix layer 2. The active matrix layer 2 is provided with the read-out circuit, which is constituted of the TFT's. The active matrix layer 2 is also provided with the accumulating capacitors. The radiation image detector 310 further comprises the electron blocking layer 3. The radiation image detector 310 still further comprises the crystallization preventing layer 4. The radiation image detector 310 also comprises the recording photoconductive layer 5. The radiation image detector 310 further comprises the intermediate layer 6. The radiation image detector 310 still further comprises a crystallization preventing layer 4'. The radiation image detector 310 also comprises the hole blocking layer 8. The radiation image detector 310 further comprises the bias electrode 7, which has the transmissivity with respect to the recording electromagnetic wave carrying the image information. The active matrix layer 2, the electron blocking layer 3, the crystallization preventing layer 4, the recording photoconductive layer 5, the intermediate layer 6, the crystallization preventing layer 4', the hole blocking layer 8, and the bias electrode 7 are overlaid in this order on the base plate 1.

The fourth embodiment of the radiation image detector 310 illustrated in FIG. 4 is constituted basically in the same manner as that in the third embodiment of the radiation image detector 210 illustrated in FIG. 3, except that the crystallization preventing layer 4' is located between the intermediate layer 6 and the hole blocking layer 8. In cases where the crystallization preventing layer 4' is thus located between the intermediate layer 6 and the hole blocking layer 8, the thermal damage to the intermediate layer 6 at the time of the overlaying of the hole blocking layer 8 is capable of being suppressed, and a radiation image detector having good durability is capable of being obtained.

Figure 6:
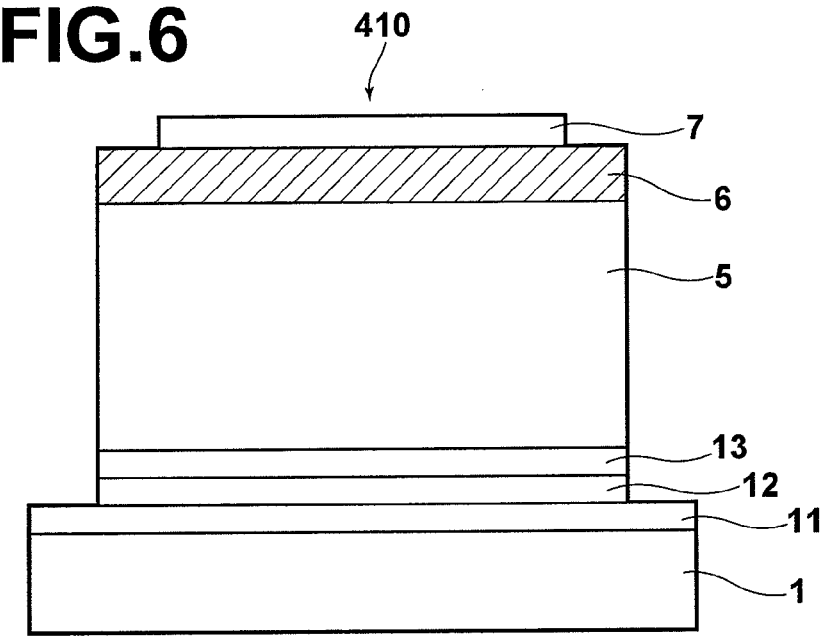
FIG. 6 is a schematic sectional view showing a fifth embodiment of the radiation image detector in accordance with the present invention, which is employed for an optical read-out technique.

FIG. 6 is a schematic sectional view showing a fifth embodiment of the radiation image detector in accordance with the present invention, which is employed for an optical read-out technique. With the optical read-out technique, the electric charges having been accumulated at the charge accumulating region are read out by the utilization of the semiconductor material, which is capable of generating the electric charges when being exposed to light. With reference to FIG. 6, a radiation image detector 410 comprises the base plate 1. The radiation image detector 410 also comprises linear electrodes 11, 11, . . . , which constitute the reference electrode. The radiation image detector 410 further comprises a reading photoconductive layer 12. The radiation image detector 410 still further comprises a charge accumulating section 13. The radiation image detector 410 also comprises the recording photoconductive layer 5. The radiation image detector 410 further comprises the intermediate layer 6. The radiation image detector 410 still further comprises the bias electrode 7, which has the transmissivity with respect to the recording electromagnetic wave carrying the image information. The linear electrodes 11, 11, which constitute the reference electrode, the reading photoconductive layer 12, the charge accumulating section 13, the recording photoconductive layer 5, the intermediate layer 6, and the bias electrode 7 are overlaid in this order on the base plate 1. In the fifth embodiment of the radiation image detector 410 illustrated in FIG. 6, the electrode, which is located on the side at the positive electric potential with respect to the charge accumulating section at the time of the readout of the electric charges of the charge accumulating section, is each of the bias electrode 7 and the reference electrode, which is constituted of the linear electrodes 11, 11, . . . .

In the cases of the radiation image detector 410 illustrated in FIG. 6, a reading line-like light source is scanned in a direction normal to each of the line-like electrodes 11, 11, . . . ., and the radiation image information is thus capable of being read out.

Figure 7:
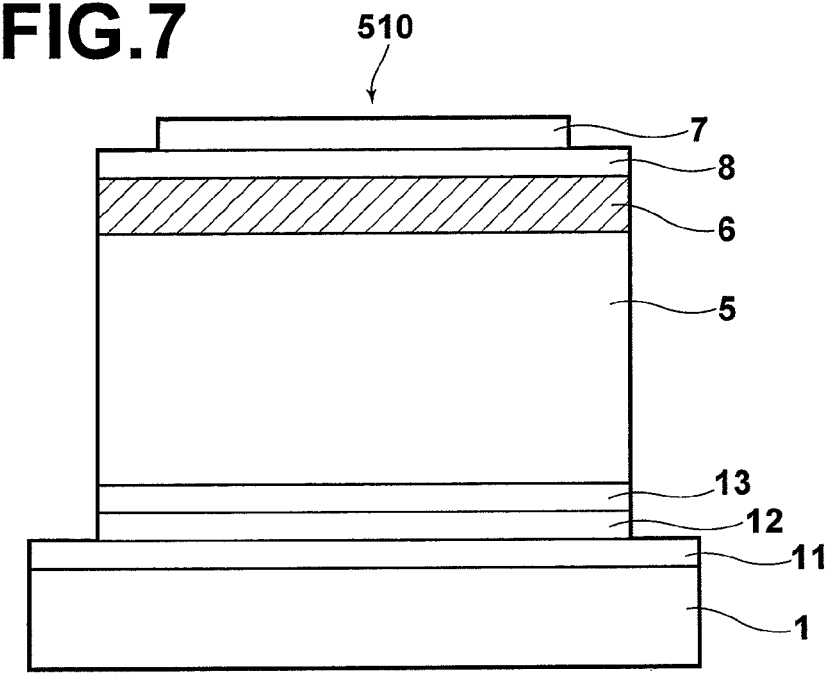
FIG. 7 is a schematic sectional view showing a sixth embodiment of the radiation image detector in accordance with the present invention, which is employed for the optical read-out technique.

FIG. 7 is a schematic sectional view showing a sixth embodiment of the radiation image detector in accordance with the present invention, which is employed for the optical read-out technique. The sixth embodiment of the radiation image detector 510 illustrated in FIG. 7 is constituted basically in the same manner as that in the fifth embodiment of the radiation image detector 410 illustrated in FIG. 6, except that the hole blocking layer 8 is located between the intermediate layer 6 and the bias electrode 7. In the cases of the radiation image detector 510 illustrated in FIG. 7, at the time at which the electric charges of the charge accumulating section 13 are to be read out, the radiation image detector 510 is in the state in which the negative electric charges are accumulated at the charge accumulating section 13. Also, at the time of the readout of the electric charges of the charge accumulating section 13, the bias electrode 7 and the reference electrode, which is constituted of the line-like electrodes 11, 11, . . . , are short-circuited with each other. Therefore, the reference electrode, which is constituted of the line-like electrodes 11, 11, . . . , is at the positive electric potential with respect to the charge accumulating section 13 at the time of the readout of the electric charges of the charge accumulating section 13. Accordingly, the radiation image detector 510 may be modified such that the intermediate layer 6 is located between the reference electrode, which is constituted of the line-like electrodes 11, 11, . . . , and the recording photoconductive layer 5 (specifically, between the reference electrode, which is constituted of the line-like electrodes 11, 11, . . . , and the reading photoconductive layer 12). As another alternative, the radiation image detector 510 may be modified such that the intermediate layer 6 is located at each of the position between the recording photoconductive layer 5 and the hole blocking layer 8 and the position between the reference electrode, which is constituted of the line-like electrodes 11, 11, . . . , and the recording photoconductive layer 5 (specifically, between the reference electrode, which is constituted of the line-like electrodes 11, 11, . . . , and the reading photoconductive layer 12).

In the sixth embodiment of the radiation image detector 510 illustrated in FIG. 7, in cases where the hole blocking layer 8 is constituted of the $Sb_2S_3$ film, the layer thickness of the hole blocking layer 8 should preferably fall within the range of 0.1 μm to 0.5 μm. If the film thickness of the $Sb_2S_3$ film is smaller than 0.1 μm, film peeling will be apt to occur. Also, in cases where the layer thickness of the $Sb_2S_3$ layer is set to be equal to at most 0.5 μm, the characteristics of the rectification contact for the blocking of the hole injection become predominant over the characteristics as the electron blocking layer, and it becomes possible for the $Sb_2S_3$ layer to be used as the hole blocking layer.

In cases where the hole blocking layer 8 is located between the intermediate layer 6 and the bias electrode 7, the insufficiency of the hole capture capability is capable of being compensated for in cases where the concentration of the specific substance in the intermediate layer 6 is low. Therefore, in such cases, the dark current is capable of being suppressed. Accordingly, in cases where the hole blocking layer 8 is provided, the concentration of the specific substance in the intermediate layer is capable of being suppressed to a value falling within the range of approximately 0.003 mol % to approximately 0.03 mol %. With the radiation image detector 510 in accordance with the present invention, wherein the hole blocking layer 8 is provided, the radiation image detector, in which the thermal damage is capable of being kept lower and in which the durability is longer, is capable of being obtained than in cases where the concentration of the specific substance in the intermediate layer 6 is increased.

EXAMPLES

Examples 1 to 15, Comparative Examples 1 to 9

A radiation image detector having the constitution identical with the constitution of the radiation image detector 10 illustrated in FIG. 1 was prepared in the manner described below.

Specifically, a base plate, on which switching TFT's and accumulating capacitors had been arrayed, was prepared. An electron blocking layer constituted of antimony sulfide ($Sb_2S_3$) and having a layer thickness of 2 μm was then formed on the base plate. Thereafter, a film was formed from an Se raw material containing As in a proportion of 3% by use of the vacuum evaporation technique, and a crystallization preventing layer having a layer thickness of 0.15 μm was formed on the electron blocking layer. Thereafter, a film was formed from an Se raw material containing Na in a proportion of 10 ppm by use of the vacuum evaporation technique, and a recording photoconductive layer constituted of amorphous Se and having a layer thickness of 200 μm was formed on the crystallization preventing layer.

Thereafter, as an intermediate layer, an a-Se layer containing LiF was formed by use of the co-vacuum evaporation technique. Specifically, firstly, an Se raw material accommodated in a Ta boat was evaporated. After the vacuum evaporation rate of Se became stable at 1 μm/minute, the evaporation of an appropriate quantity of an LiF raw material was begun. More specifically, the LiF raw material was accommodated in an $Al_2O_3$ crucible, and the crucible was heated with a tungsten filament heater. (The radiation image detectors of Examples 1 to 15 and the radiation image detectors of Comparative Examples 2 to 9 were prepared through appropriate adjustments of the quantity of the electric current applied to the tungsten filament heater with respect to time.) After the co-vacuum evaporation processing had been performed for a predetermined period of time, the vapor coming from the boat for LiF and the vapor coming from the boat for Se were cut off simultaneously by use of cell shutters, and each of the intermediate layers having the thicknesses listed in Table 1 below was formed. (The layer thickness of each of the intermediate layers was set by the adjustment of the vacuum evaporation processing time. In Comparative Example 1, the intermediate layer was not formed.)

Further, an Au film was formed on the intermediate layer by use of the vacuum evaporation technique, and a bias electrode having a layer thickness of 0.1 μm was thereby formed. Finally, a voltage application cable was connected on the bias electrode, and a peripheral actuation circuit was mounted on the TFT array X-ray electric charge converting film base plate. In this manner, each of the radiation image detectors was obtained.

Films identical with those described above were formed with the same constitutions as those described above with simultaneous processes on each of 5 cm-square glass base plates provided with an amorphous IZO layer. In this manner, each of reference detectors for measurement of the dark current and the X-ray sensitivity described above was prepared.

(Measurement of Image Defects Before and After an accelerated high temperature test)

TFT pixel size: 150 μm

Accelerated test: Three months at 40° C.

(In cases where the accelerated test temperature was set at 40° C., and experiments were made with the accelerated test time being set at various different values, a difference in image defect increase was capable of being discriminated with the passage of time of the accelerated test of three months. Therefore, the conditions of three months at 40° C. were employed for the evaluation.)

Electric field application: Measurement was made at the stage 60 seconds after the application of a voltage of +2 kV to the bias electrode was performed.

With respect to each of the radiation image detectors having been prepared in the manner described above, a relative change in number of image defects at the stage before the accelerated test was made under the conditions described above and at the stage after the accelerated test was made under the conditions described above was calculated. The number of the image defects in the image at each of the stage before the accelerated test was made under the conditions described above and the stage after the accelerated test was made under the conditions described above was calculated in the manner described below. Specifically, firstly, an offset image was acquired at the stage 60 seconds after the application of a voltage of +2 kV to the bias electrode was performed. A pixel having an abnormal image density, which exceeded a level five times as high as an image density fluctuation variance of the offset image, was regarded as a defective pixel. The total number of the abnormal pixels was calculated as the number of the image defects. Table 1 lists the number of the image defects at the stage after the accelerated test was made under the conditions described above, the number being shown as a relative value with respect to the number of the image defects in Comparative Example 1.

(Measurement of Dark Current and X-Ray Sensitivity)

A voltage of +2 kV was applied to the top electrode of the reference detector described above. Also, an ammeter was connected to the IZO layer, and the dark current and the X-ray sensitivity were read out. As the dark current, the current value at the stage 60 seconds after the application of the bias voltage was performed was measured. The X-ray sensitivity was measured in the manner described below. Specifically, after a bias electric field was applied for 600 seconds, the X-rays having been produced under the conditions of a tube voltage of 28 kV (an Mo tube) and a tube current of 80 mA and having passed through an Mo filter (30 μm) and an Al filter (2 mm) were irradiated to the reference detector for a period of time of 710 msec. At this time, the quantity of the electric charges having been collected was measured and taken as the X-ray sensitivity. Table 1 lists each of the dark current and the X-ray sensitivity of each sample as a relative value with respect to the value in Comparative Example 1.

(Measurement of a Layer Thickness of an Intermediate Layer)

The layer thickness of the intermediate layer in the radiation image detector was measured in the manner described below. Specifically, the distribution of the concentration of Li having been added to the Se film, which was formed on an Si base plate by use of the simultaneous film formation processing, was measured by use of a secondary ion mass spectrometry (SIMS) technique. Also, a measurement was made to find the length of a region sandwiched between two interfaces, which were associated with the value of 10% of the maximum Li concentration in the intermediate layer and which were disposed at the largest spacing from each other. Oxygen ions were employed as the primary ions to be used for the SIMS technique, and the measurement of the distribution of Li with respect to the depth direction was performed till a lower limit value of the detection limit was reached. After the SIMS measurement was finished, the depths of craters having been formed due to the measurement were measured directly by use of a stylus type surface level difference meter (P-10, supplied by KLA-Tencor Co.) and subjected to mean conversion as the value of the SIMS data end point.

Figure 8:
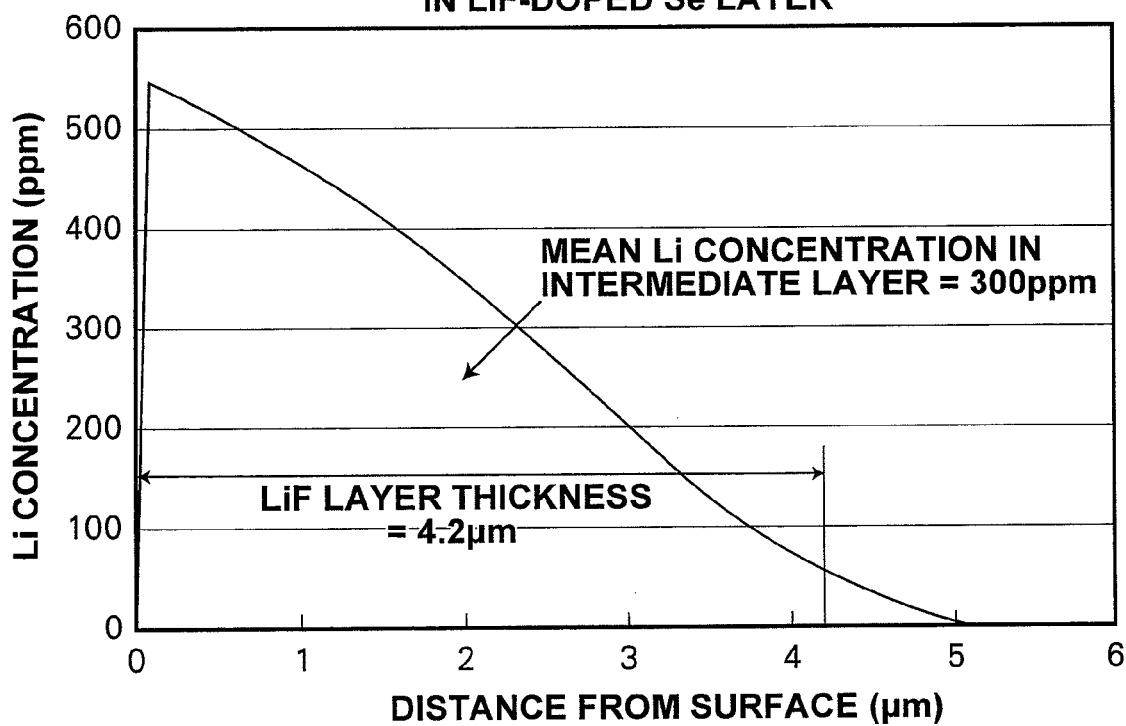
FIG. 8 is a graph showing a distribution of an Li concentration in an intermediate layer, as measured with SIMS.

Table 2 lists the SIMS measurement conditions. FIG. 8 shows an example of measurement of a distribution of an Li concentration in an intermediate layer in Example 13, as measured with SIMS. As illustrated in FIG. 8, the maximum Li concentration in the intermediate layer in Example 13 was equal to approximately 550 ppm. Also, the length of the region sandwiched between the two interfaces, which were associated with the value of 10% of the maximum Li concentration in the intermediate layer and which were disposed at the largest spacing from each other, was equal to 4.2 μm. (In FIG. 8, the 10% value on the side close to the surface was approximately in the state in which the 10% value overlapped upon the vertical axis of the graph.)

(Measurement of a Concentration of a Specific Substance in an Intermediate Layer)

The LiF concentration in the intermediate layer was represented by a mean Li concentration (mol) in the region sandwiched between the two interfaces, which were associated with the value of 10% of the maximum LiF concentration in the intermediate layer and which were disposed at the largest spacing from each other. Specifically, all Li count numbers in the region sandwiched between the two interfaces described above are subjected to an integration operation, and the resulting Li count number was divided by the layer thickness of the intermediate layer. The means Li count number per unit layer thickness having thus been obtained was converted into the Li concentration in accordance with the sensitivity correcting technique described later, and the mean Li concentration (mol) was thereby obtained. More specifically, as for the LiF molar concentration, the LiF concentration was expressed in terms of the Li concentration, and it was regarded that the measured concentration value of F (which is one of halogens) might be lower than the measured concentration value of Li. The sensitivity correcting technique described below was utilized.

Sensitivity correcting technique: A sample containing Se and LiF was prepared for used in sensitivity correction. Firstly, the Se concentration and the Li concentration were determined quantitatively by use of an ICP-MS analysis technique. Thereafter, the same sample was subjected to the SIMS measurement, and a sensitivity correction coefficient was calculated such that the Se concentration and the Li concentration might coincide with the SIMS measured values. The quantitative determination of the distribution of the Li concentration in a predetermined sample was made in accordance with the thus calculated sensitivity correction coefficient.

The LiF concentration is herein represented by the mean Li concentration (mol). In the same manner as that for Li, the distribution of the concentration of F (which is one of the halogens) is capable of being measured with the SIMS technique. In such cases, Cs ions may be employed as the primary ions for use in the SIMS technique.

TABLE 1

| | Intermediate layer | | Number of image | | X-ray |
| | LiF concentration (mol %) | Layer thickness (μm) | defects after accelerated test (relative value) | Dark current (relative value) | sensitivity (relative value) |
| --- | --- | --- | --- | --- | --- |
| Comp. Ex. 1 | — | — | 1 (reference) | 1000 (reference) | 1 (reference) |
| Comp. Ex. 2 | 0.001 | 0.2 | 1 | 500 | 1 |
| Comp. Ex. 3 | 0.001 | 2 | 1 | 500 | 1 |
| Comp. Ex. 4 | 0.001 | 4.2 | 1 | 500 | 1 |
| Comp. Ex. 5 | 0.001 | 20 | 1 | 500 | 1 |
| Example 1 | 0.003 | 0.2 | 1 | 10 | 1 |
| Example 2 | 0.003 | 2 | 1 | 1 | 1 |
| Example 3 | 0.003 | 4.2 | 1 | 1 | 1 |
| Example 4 | 0.003 | 20 | 1 | 1 | 1 |
| Example 5 | 0.003 | 50 | 1 | 1 | 0.85 |
| Example 6 | 0.01 | 0.2 | 1 | 5 | 1 |
| Example 7 | 0.01 | 2 | 1 | 1 | 1 |
| Example 8 | 0.01 | 4.2 | 1 | 1 | 1 |
| Example 9 | 0.01 | 20 | 1 | 1 | 1 |
| Example 10 | 0.01 | 50 | 1.1 | 1 | 0.80 |
| Example 11 | 0.03 | 0.2 | 1.1 | 3 | 1 |
| Example 12 | 0.03 | 2 | 1.1 | 1 | 1 |
| Example 13 | 0.03 | 4.2 | 1.1 | 1 | 1 |
| Example 14 | 0.03 | 20 | 1.1 | 1 | 1 |
| Example 15 | 0.03 | 50 | 1.1 | 1 | 0.75 |
| Comp. Ex. 6 | 0.05 | 0.2 | 2.2 | 1 | 1 |
| Comp. Ex. 7 | 0.07 | 0.2 | 7.5 | 1 | 1 |
| Comp. Ex. 8 | 0.1 | 0.2 | 27 | 1 | 1 |
| Comp. Ex. 9 | 0.2 | 0.2 | 500 | 1 | 1 |

TABLE 2

| Item | Li measurement |
| --- | --- |
| Primary ions | $O^{2+}$ |
| Primary ion energy (eV) | 3000 |
| Primary ion current (nA) | 40 |
| Scanning region (μm × μm) | 400 × 570 |

TABLE 2-continued

| Item | Li measurement |
| --- | --- |
| Detection region (%) | 9 |
| Incidence angle (deg.) | 45 |
| Secondary ion polarity | Positive |
| Oxygen gas leak | None |
| Charge compensation | Performed |

As clear from Table 1, as for each of the radiation image detectors prepared in Examples 1 to 15, wherein the LiF concentration in the intermediate layer was equal to at most 0.03%, the rate of increase in number of image defects between the stage before the accelerated test was made and the stage after the accelerated test was made was significantly lower than in the radiation image detectors prepared in Comparative Examples 6, 7, 8, and 9. Also, as for each of the radiation image detectors prepared in Examples 1 to 15, wherein the LiF concentration in the intermediate layer was equal to at least 0.003%, the dark current was significantly lower than in the radiation image detectors prepared in Comparative Examples 1, 2, 3, 4, and 5. Further, as for each of the radiation image detectors prepared in Examples 2, 3, and 4, wherein the layer thickness of the intermediate layer was equal to at least 2 μm, the dark current was markedly lower than in the radiation image detector prepared in Example 1, wherein the layer thickness of the intermediate layer was equal to 0.2 μm. Furthermore, as for each of the radiation image detectors prepared in Examples 1, 2, 3, 4, 6, 7, 8, 9, 11, 12, 13, and 14, wherein the layer thickness of the intermediate layer was equal to at most 20 μm, the X-ray sensitivity was significantly higher than in the radiation image detectors prepared in Examples 5, 10, and 15, wherein the layer thickness of the intermediate layer was equal to 50 μm.

As clear from the foregoing, the radiation image detector in accordance with the present invention is provided with the intermediate layer, which is located between the recording photoconductive layer and the electrode on the side of the application of a positive bias. The intermediate layer is the a-Se layer containing LiF (which is one of alkali metal fluorides) as the specific substance, the concentration of the specific substance falling within the range of 0.003 mol % to 0.03 mol %. Therefore, with the radiation image detector in accordance with the present invention, an increase in dark current is capable of being prevented from occurring, and an increase in image defects with the passage of time is capable of being prevented from occurring.

Examples 16, 17, and 18

A radiation image detector having the constitution identical with the constitution of the radiation image detector 210 illustrated in FIG. 3 was prepared in the manner described below.

Specifically, a base plate, on which switching TFT's and accumulating capacitors had been arrayed, was prepared. An electron blocking layer constituted of antimony sulfide ($Sb_2S_3$) and having a layer thickness of 2 μm was then formed on the base plate. Thereafter, a film was formed from an Se raw material containing As in a proportion of 3% by use of the vacuum evaporation technique, and a crystallization preventing layer having a layer thickness of 0.15 μm was formed on the electron blocking layer. Thereafter, a film was formed from an Se raw material containing Na in a proportion of 10 ppm by use of the vacuum evaporation technique, and a recording photoconductive layer constituted of amorphous Se and having a layer thickness of 200 μm was formed on the crystallization preventing layer.

Thereafter, as an intermediate layer, an a-Se layer containing LiF was formed by use of the co-vacuum evaporation technique. Specifically, firstly, an Se raw material accommodated in a Ta boat was evaporated. After the vacuum evaporation rate of Se became stable at 1 μm/minute, the evaporation of an appropriate quantity of an LiF raw material was begun. More specifically, the LiF raw material was accommodated in an $Al_2O_3$ crucible, and the crucible was heated with a tungsten filament heater. (The radiation image detectors of Examples 16, 17, and 18 were prepared through appropriate adjustments of the quantity of the electric current applied to the tungsten filament heater with respect to time.) After the co-vacuum evaporation processing had been performed for a predetermined period of time, the vapor coming from the boat for LiF and the vapor coming from the boat for Se were cut off simultaneously by use of cell shutters, and each of the intermediate layers having the thickness of approximately 0.2 μm was formed. (The layer thickness of each of the intermediate layers was set by the adjustment of the vacuum evaporation processing time.)

Further, a hole blocking layer constituted of antimony sulfide ($Sb_2S_3$) and having a layer thickness of 0.3 μm was formed on the intermediate layer. Furthermore, an Au film was formed on the hole blocking layer by use of the vacuum evaporation technique, and a bias electrode having a layer thickness of 0.1 μm was thereby formed. Finally, a voltage application cable was connected on the bias electrode, and a peripheral actuation circuit was mounted on the TFT array X-ray electric charge converting film base plate. In this manner, each of the radiation image detectors was obtained.

Also, in the same manner as that in Examples 1 to 15 and Comparative Examples 1 to 9, each of reference detectors was prepared. Further, in the same manner as that described above, the number of the image defects at the stage after the accelerated test was made and the dark current were evaluated. The results shown in Table 3 below were obtained.

TABLE 3

| | Intermediate layer | | Hole blocking layer | | Number of image defects | Dark current |
| --- | --- | --- | --- | --- | --- | --- |
| | LiF concentration (mol %) | Layer thickness (μm) | Substance | Layer thickness (μm) | after accelerated test (relative value) | (relative value) |
| Example 1 | 0.003 | 0.2 | — | — | 1 | 10 |
| Example 6 | 0.01 | 0.2 | — | — | 1 | 5 |
| Example 11 | 0.03 | 0.2 | — | — | 1.1 | 3 |

TABLE 3-continued

| | Intermediate layer | | Hole blocking layer | | Number of image defects after accelerated test (relative value) | Dark current (relative value) |
|---|---|---|---|---|---|---|
| | LiF concentration (mol %) | Layer thickness (μm) | Substance | Layer thickness (μm) | | |
| Example 16 | 0.003 | 0.2 | $Sb_2S_3$ | 0.3 | 1.1 | 1 |
| Example 17 | 0.01 | 0.2 | $Sb_2S_3$ | 0.3 | 1.2 | 1 |
| Example 18 | 0.03 | 0.2 | $Sb_2S_3$ | 0.3 | 1.3 | 1 |

As clear from Table 3, as for each of the radiation image detectors prepared in Examples 16, 17, and 18, wherein the $Sb_2S_3$ layer acting as the hole blocking layer was overlaid between the intermediate layer and the positive bias electrode, the insufficiency of the hole capture capability was capable of being compensated for in cases where the concentration of the dopant in the intermediate layer was as low as a value falling within the range of 0.003 mol % to 0.03 mol % and in cases where the layer thickness of the intermediate layer was as thin as 0.2 μm. Therefore, in such cases, the dark current was capable of being suppressed. The effects described above were capable of being obtained presumably since the layer thickness of the $Sb_2S_3$ layer acting as the hole blocking layer was set to be as thin as 0.3 μm, the characteristics of the rectification contact for the blocking of the hole injection became predominant over the characteristics as the electron blocking layer. If the doping concentration in the hole capture layer is set to be high, thermal damage in the production process will become large, and the problems with regard to the durability will occur. However, by the provision of the hole blocking layer, the doping concentration need not be set to be high.

Examples 19 to 33, Comparative Examples 10 to 18

A radiation image detector having the constitution identical with the constitution of the radiation image detector 410 illustrated in FIG. 6, which is employed for the optical read-out technique, was prepared in the manner described below.

Specifically, a base plate, on which linear electrodes constituted of IZO had been arrayed, was prepared. A reading photoconductive layer constituted of a-Se and having a layer thickness of 10 μm was then formed on the base plate. Thereafter, a film was formed from an $As_2Se_3$ raw material by use of the vacuum evaporation technique, and a charge accumulating section constituted of amorphous $As_2Se_3$ and having a layer thickness of 1 μm was formed on the reading photoconductive layer. Thereafter, a film was formed from an Se raw material containing Na in a proportion of 10 ppm by use of the vacuum evaporation technique, and a recording photoconductive layer constituted of amorphous Se and having a layer thickness of 200 μm was formed on the charge accumulating section.

Thereafter, as an intermediate layer, an a-Se layer containing LiF was formed by use of the co-vacuum evaporation technique. Specifically, firstly, an Se raw material accommodated in a Ta boat was evaporated. After the vacuum evaporation rate of Se became stable at 1 μm/minute, the evaporation of an LiF raw material was begun. More specifically, the LiF raw material was accommodated in an $Al_2O_3$ crucible, and the crucible was heated with a tungsten filament heater. After the co-vacuum evaporation processing had been performed for approximately seven minutes, the vapor coming from the boat for LiF and the vapor coming from the boat for Se were cutoff simultaneously by use of cell shutters, and the intermediate layer was thus formed.

Further, an Au film was formed on the intermediate layer by use of the vacuum evaporation technique, and a bias electrode having a layer thickness of 0.1 μm was thereby formed. Finally, a voltage application cable was connected on the bias electrode, and a read-out circuit was mounted on the IZO linear electrode base plate.

(Measurement of Image Defects Before and After an Accelerated Test)

IZO linear electrode pitch (pixel size): 50 μm

Accelerated test: Three months at 40° C.

Electric field application: Measurement was made at the stage 60 seconds after the application of a voltage of −2 kV to the bias electrode was performed.

With respect to each of the radiation image detectors having been prepared in the manner described above, a relative change in number of image defects at the stage before the accelerated test was made under the conditions described above and at the stage after the accelerated test was made under the conditions described above was calculated. The number of the image defects in the image at each of the stage before the accelerated test was made under the conditions described above and the stage after the accelerated test was made under the conditions described above was calculated in the manner described below. Specifically, firstly, after the application of a voltage of −2 kV to the bias electrode was performed, the top electrode was short-circuited, and a scanning operation with light having been produced by a line-like light source was performed in the direction normal to each of the linear electrodes. In this manner, an offset image was acquired. A pixel having an abnormal image density, which exceeded a level five times as high as an image density fluctuation variance of the offset image, was regarded as a defective pixel. The total number of the abnormal pixels was calculated as the number of the image defects. A comparison was made with respect to the ratio of the number of the image defects at the stage after the accelerated test was made to the number of the image defects at the stage before the accelerated test was made.

(Measurement of X-Ray Sensitivity)

Figure 9:
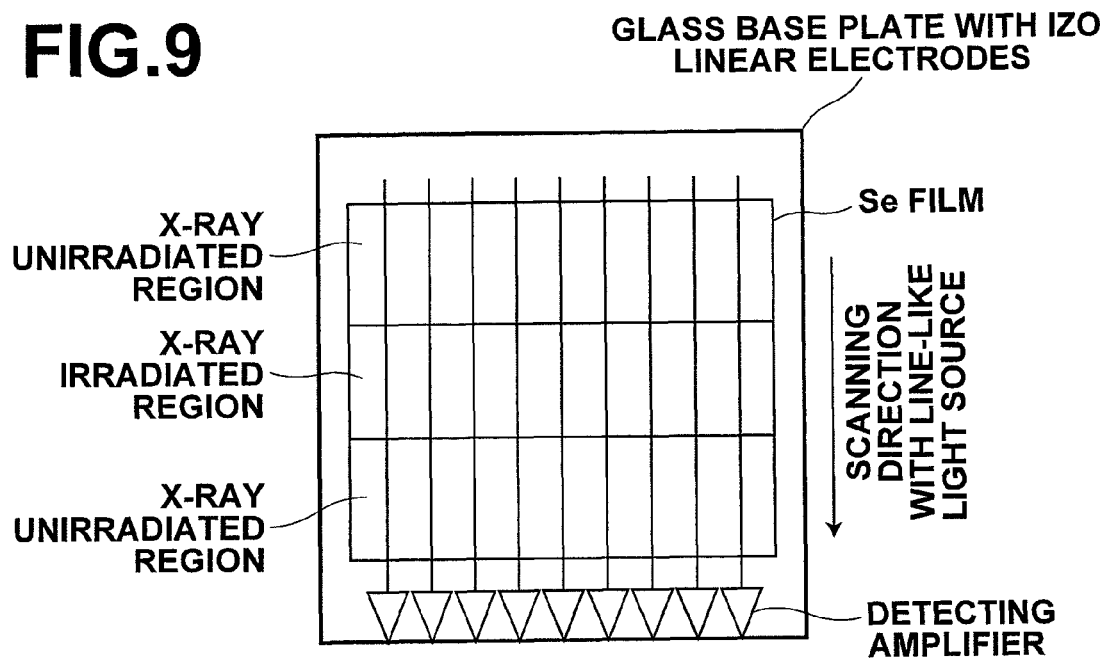
FIG. 9 is an explanatory view showing an irradiation region in an image utilized for X-ray sensitivity measurement for the radiation image detector employed for the optical read-out technique.
Figure 10:
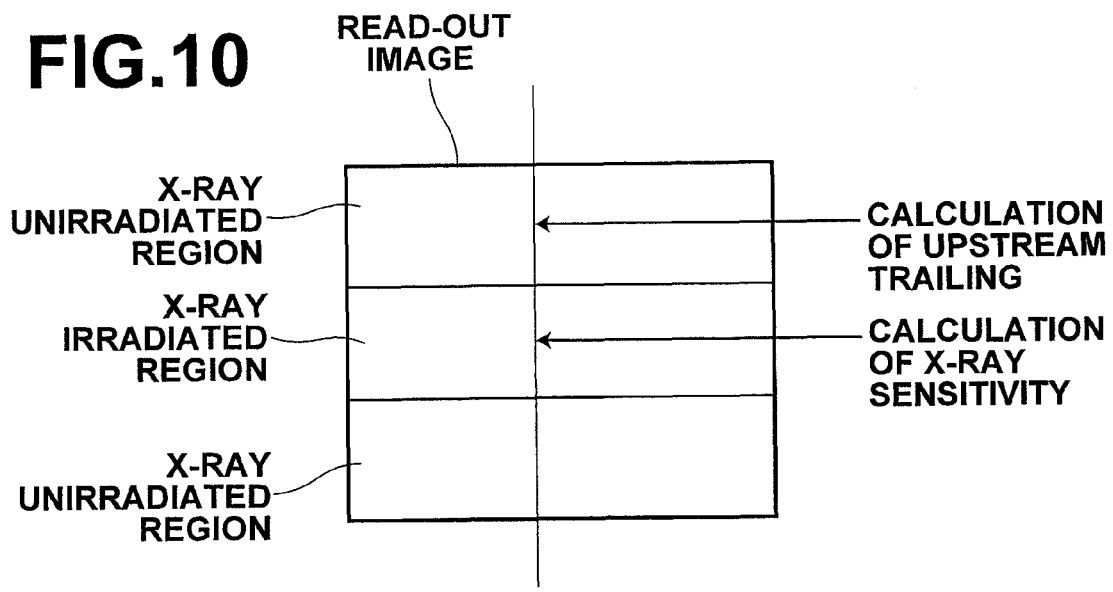
FIG. 10 is an explanatory view showing the irradiation region in the image utilized for the X-ray sensitivity measurement for the radiation image detector employed for the optical read-out technique.

A voltage of −2 kV was applied for two seconds to the bias electrode of the radiation image detector. During the voltage application, the X-rays having been produced under the conditions of a tube voltage of 28 kV (an Mo tube) and a tube current of 80 mA and having passed through an Mo filter (3 μm) and an Al filter (2 mm) were irradiated to the radiation image detector for a period of time of 710 msec, and an X-ray image was accumulated at the charge accumulating section. At this time, the X-rays were irradiated only to the middle third region of the detector (as illustrated in FIG. 9). Thereafter, the bias electrode was short-circuited, and the image was read out during the period of time falling within the range of one second to five seconds after the short-circuiting was performed. The signal quantity at the region having been irradiated to the X-rays was taken as the X-ray sensitivity (as illustrated in FIG. 10).

(Measurement of Hole Injection Current Induced in an X-Ray Latent Image)

In the region upstream from the X-ray irradiation pattern (i.e., in the region having been previously subjected to the image read-out operation), a phenomenon occurs such that an addition of an offset quantity depending upon the X-ray irradiation quantity (which offset quantity is of a negative value, i.e. has the polarity reverse to the polarity of the X-ray signal) arises. (The phenomenon will hereinbelow be referred to as the upstream trailing.) The upstream trailing occurs presumably since, in cases where the bias electrode is grounded in the state in which the electrons have been accumulated at the charge accumulating section, the grounded bias electrode has the positive electric potential with respect to the charge accumulating section, the holes are injected from the bias electrode, and the resulting dark current is detected. Since the internal electric field originates from the state in which the electrons have been accumulated at the charge accumulating section, the phenomenon described above occurs only at the upstream region.

A voltage of −2 kV was applied for two seconds to the bias electrode of the radiation image detector. During the voltage application, the X-rays having been produced under the conditions of a tube voltage of 28 kV (an Mo tube) and a tube current of 80 mA and having passed through an Mo filter (30 μm) (without an Al filter (2 mm)) were irradiated to the radiation image detector for a period of time of 710 msec, and an X-ray image was accumulated at the charge accumulating section. At this time, the X-rays were irradiated only to the middle third region of the detector (as illustrated in FIG. 9). Thereafter, the bias electrode was short-circuited, and the image was read out during the period of time falling within the range of one second to five seconds after the short-circuiting was performed. A median value of the offset region, which was located on the side upstream from the region having been irradiated to the X-rays, was taken as the upstream trailing quantity (as illustrated in FIG. 10). The results as shown in Table 4 below were obtained. As for each of the samples, each of the number of the image defects at the stage after the accelerated test was made, the upstream trailing quantity, and the X-ray sensitivity was listed as a relative value with respect to the value in Comparative Example 10.

TABLE 4

| | Intermediate layer | | Number of image defects after accelerated test (relative value) | Upstream trailing (relative value) | X-ray sensitivity (relative value) |
| --- | --- | --- | --- | --- | --- |
| | LiF concentration (mol %) | Layer thickness (μm) | | | |
| Comp. Ex. 10 | — | — | 1 (reference) | 100 (reference) | 1 (reference) |
| Comp. Ex. 11 | 0.001 | 0.2 | 1 | 50 | 1 |
| Comp. Ex. 12 | 0.001 | 2 | 1 | 50 | 1 |
| Comp. Ex. 13 | 0.001 | 4.2 | 1 | 50 | 1 |
| Comp. Ex. 14 | 0.001 | 20 | 1 | 50 | 1 |
| Example 19 | 0.003 | 0.2 | 1 | 2 | 1 |
| Example 20 | 0.003 | 2 | 1 | 1 | 1 |
| Example 21 | 0.003 | 4.2 | 1 | 1 | 1 |
| Example 22 | 0.003 | 20 | 1 | 1 | 1 |
| Example 23 | 0.003 | 50 | 1 | 1 | 0.85 |
| Example 24 | 0.01 | 0.2 | 1 | 1 | 1 |
| Example 25 | 0.01 | 2 | 1 | 1 | 1 |
| Example 26 | 0.01 | 4.2 | 1 | 1 | 1 |
| Example 27 | 0.01 | 20 | 1 | 1 | 1 |
| Example 28 | 0.01 | 50 | 1.1 | 1 | 0.80 |
| Example 29 | 0.03 | 0.2 | 1.1 | 1 | 1 |
| Example 30 | 0.03 | 2 | 1.1 | 1 | 1 |
| Example 31 | 0.03 | 4.2 | 1.1 | 1 | 1 |
| Example 32 | 0.03 | 20 | 1.1 | 1 | 1 |
| Example 33 | 0.03 | 50 | 1.1 | 1 | 0.75 |
| Comp. Ex. 15 | 0.05 | 0.2 | 2.2 | 1 | 1 |
| Comp. Ex. 16 | 0.07 | 0.2 | 7.5 | 1 | 1 |
| Comp. Ex. 17 | 0.1 | 0.2 | 27 | 1 | 1 |
| Comp. Ex. 18 | 0.2 | 0.2 | 500 | 1 | 1 |

As clear from Table 4, as for each of the radiation image detectors prepared in Examples 19 to 33, wherein the LiF concentration in the intermediate layer was equal to at most 0.03%, the rate of increase in number of image defects between the stage before the accelerated test was made and the stage after the accelerated test was made was significantly lower than in the radiation image detectors prepared in Comparative Examples 15, 16, 17, and 18. Also, as for each of the radiation image detectors prepared in Examples 19 to 33, wherein the LiF concentration in the intermediate layer was equal to at least 0.003%, the upstream trailing was significantly lower than in the radiation image detectors prepared in Comparative Examples 10, 11, 12, 13, and 14. Further, as for each of the radiation image detectors prepared in Examples 20, 21, 22, and 23, wherein the layer thickness of the intermediate layer was equal to at least 2 μm, the upstream trailing was markedly lower than in the radiation image detector prepared in Example 19, wherein the layer thickness of the intermediate layer was equal to 0.2 μm. Furthermore, as for each of the radiation image detectors prepared in Examples 19, 20, 21, 22, 24, 25, 26, 27, 29, 30, 31, and 32, wherein the layer thickness of the intermediate layer was equal to at most 20 μm, the X-ray sensitivity was significantly higher than in the radiation image detectors prepared in Examples 23, 28, and 33, wherein the layer thickness of the intermediate layer was equal to 50 μm.

As clear from the foregoing, the radiation image detector in accordance with the present invention is provided with the intermediate layer between the recording photoconductive layer and the bias electrode, which is located on the side at the positive electric potential with respect to the charge accumulating section at the time of the readout of the electric charges of the charge accumulating section. The intermediate layer is the a-Se layer containing LiF (which is one of alkali metal fluorides) as the specific substance, the concentration of the specific substance falling within the range of 0.003 mol % to 0.03 mol %. Therefore, with the radiation image detector in accordance with the present invention, an increase in upstream trailing is capable of being prevented from occurring, and an increase in image defects with the passage of time is capable of being prevented from occurring.

It has been explained above that the electrode, which is located on the side at the positive electric potential with respect to the charge accumulating section at the time of the readout of the electric charges of the charge accumulating section, is the bias electrode. However, in this fifth embodiment of the radiation image detector 410 illustrated in FIG. 6, at the time at which the electric charges of the charge accumulating section 13 are to be read out, the radiation image detector 410 is in the state in which the negative electric charges are accumulated at the charge accumulating section 13. Also, at the time of the readout of the electric charges of the charge accumulating section 13, the bias electrode 7 and the reference electrode, which is constituted of the line-like electrodes 11, 11, . . . , are short-circuited with each other. Therefore, the reference electrode, which is constituted of the line-like electrodes 11, 11, . . . , is at the positive electric potential with respect to the charge accumulating section 13 at the time of the readout of the electric charges of the charge accumulating section 13. Accordingly, the radiation image detector 410 may be modified such that the intermediate layer 6 is located between the reference electrode, which is constituted of the line-like electrodes 11, 11, . . . , and the recording photoconductive layer 5 (specifically, between the reference electrode, which is constituted of the line-like electrodes 11, 11, . . . , and the reading photoconductive layer 12). In such cases, the same effects as those described above are capable of being obtained. As another alternative, the radiation image detector 410 may be modified such that the intermediate layer 6 is located at each of the position between the recording photoconductive layer 5 and the bias electrode 7 and the position between the reference electrode, which is constituted of the line-like electrodes 11, 11, . . . , and the recording photoconductive layer 5 (specifically, between the reference electrode, which is constituted of the line-like electrodes 11, 11, . . . , and the reading photoconductive layer 12).

Examples 34, 35, and 36

A radiation image detector having the constitution identical with the constitution of the radiation image detector 510 illustrated in FIG. 7, which is employed for the optical read-out technique, was prepared in the manner described below.

Specifically, a base plate, on which linear electrodes constituted of IZO had been arrayed, was prepared. A reading photoconductive layer constituted of a-Se and having a layer thickness of 10 μm was then formed on the base plate. Thereafter, a film was formed from an $As_2Se_3$ raw material by use of the vacuum evaporation technique, and a charge accumulating section constituted of amorphous $As_2Se_3$ and having a layer thickness of 1 μm was formed on the reading photoconductive layer. Thereafter, a film was formed from an Se raw material containing Na in a proportion of 10 ppm by use of the vacuum evaporation technique, and a recording photoconductive layer constituted of amorphous Se and having a layer thickness of 200 μm was formed on the charge accumulating section.

Thereafter, as an intermediate layer, an a-Se layer containing LiF was formed by use of the co-vacuum evaporation technique. Specifically, firstly, an Se raw material accommodated in a Ta boat was evaporated. After the vacuum evaporation rate of Se became stable at 1 μm/minute, the evaporation of an LiF raw material was begun. More specifically, the LiF raw material was accommodated in an $Al_2O_3$ crucible, and the crucible was heated with a tungsten filament heater. (The radiation image detectors of Examples 34, 35, and 36 were prepared through appropriate adjustments of the quantity of the electric current applied to the tungsten filament heater with respect to time.) After the co-vacuum evaporation processing had been performed for a predetermined period of time, the vapor coming from the boat for LiF and the vapor coming from the boat for Se were cut off simultaneously by use of cell shutters, and each of the intermediate layers was formed. (The layer thickness of each of the intermediate layers was set by the adjustment of the vacuum evaporation processing time.)

Further, a hole blocking layer constituted of antimony sulfide ($Sb_2S_3$) and having a layer thickness of 0.3 μm was formed on the intermediate layer. Furthermore, an Au film was formed on the hole blocking layer by use of the vacuum evaporation technique, and a bias electrode having a layer thickness of 0.1 μm was thereby formed. Finally, a voltage application cable was connected on the bias electrode, and a read-out circuit was mounted on the IZO linear electrode base plate. Also, in the same manner as that described above, the number of the image defects at the stage after the accelerated test was made and the upstream trailing were evaluated. The results shown in Table 5 below were obtained.

TABLE 5

|  | Intermediate layer | | Hole blocking layer | | Number of image defects after accelerated test (relative value) | Upstream trailing (relative value) |
| --- | --- | --- | --- | --- | --- | --- |
|  | LiF concentration (mol %) | Layer thickness (μm) | Substance | Layer thickness (μm) | | |
| Example 19 | 0.003 | 0.2 | — | — | 1 | 3 |
| Example 24 | 0.01 | 0.2 | — | — | 1 | 2 |
| Example 29 | 0.03 | 0.2 | — | — | 1.1 | 1.5 |

TABLE 5-continued

|  | Intermediate layer | | Hole blocking layer | | Number of image defects after accelerated test (relative value) | Upstream trailing (relative value) |
| --- | --- | --- | --- | --- | --- | --- |
|  | LiF concentration (mol %) | Layer thickness (μm) | Substance | Layer thickness (μm) | | |
| Example 34 | 0.003 | 0.2 | $Sb_2S_3$ | 0.3 | 1.1 | 1 |
| Example 35 | 0.01 | 0.2 | $Sb_2S_3$ | 0.3 | 1.2 | 1 |
| Example 36 | 0.03 | 0.2 | $Sb_2S_3$ | 0.3 | 1.3 | 1 |

As clear from Table 5, as for each of the radiation image detectors prepared in Examples 34, 35, and 36, wherein the $Sb_2S_3$ layer acting as the hole blocking layer was overlaid between the intermediate layer and the electrode, which was located on the side at the positive electric potential with respect to the charge accumulating section at the time of the readout of the electric charges of the charge accumulating section, the insufficiency of the hole capture capability was capable of being compensated for in cases where the concentration of the dopant in the intermediate layer was as low as a value falling within the range of 0.003 mol % to 0.03 mol % and in cases where the layer thickness of the intermediate layer was as thin as 0.2 μm. Therefore, in such cases, the upstream trailing was capable of being suppressed. The effects described above were capable of being obtained presumably since the layer thickness of the $Sb_2S_3$ layer acting as the hole blocking layer was set to be as thin as 0.3 μm, the characteristics of the rectification contact for the blocking of the hole injection became predominant over the characteristics as the electron blocking layer. If the doping concentration in the hole capture layer is set to be high, thermal damage in the production process will become large, and the problems with regard to the durability will occur. However, by the provision of the hole blocking layer, the doping concentration need not be set to be high.

In Examples 1 to 36 described above, only LiF (which is one of the alkali metal fluorides) is exemplified as the specific substance. However, as the specific substance, it is possible to employ at least one kind of substance selected from the group consisting of the alkali metal fluoride, the alkaline earth metal fluoride, the alkali metal oxide, the alkaline earth metal oxide, $SiO_x$, and $GeO_x$, where x represents a number satisfying $0.5 \leq x \leq 1.5$, preferably x=1. The above-enumerated specific substances have boiling temperatures of approximately at most 1,300° C., and have approximately identical levels of the characteristics with respect to the thermal damage to Se. Also, the above-enumerated specific substances have approximately identical characteristics with respect to the formation of localized levels for the hole capture in a-Se. Further, it is considered that the above-enumerated specific substances are present in the molecule forms in a-Se and are not apt to diffuse in a-Se.

What is claimed is:

1. A radiation image detector, comprising:
    i) a bias electrode, which has transmissivity with respect to a recording electromagnetic wave carrying image information,
    ii) a recording photoconductive layer, which contains a-Se as a principal constituent, and which is capable of generating electric charges when the recording electromagnetic wave having passed through the bias electrode is irradiated to the recording photoconductive layer,
    iii) a charge accumulating section, which accumulates the generated electric charges,
    iv) a reference electrode constituted of a plurality of electrodes, and
    v) a base plate,
    the bias electrode, the recording photoconductive layer, the charge accumulating section, the reference electrode, and the base plate being overlaid in this order,
    wherein the improvement comprises the provision of an intermediate layer between the recording photoconductive layer and the electrode, which is either one of the bias electrode and the reference electrode, and which is located on the side at positive electric potential with respect to the charge accumulating section at the time of readout of the electric charges of the charge accumulating section,
    the intermediate layer being an a-Se layer containing, as a specific substance, at least one kind of substance selected from the group consisting of an alkali metal fluoride, an alkaline earth metal fluoride, an alkali metal oxide, an alkaline earth metal oxide, $SiO_x$, and $GeO_x$, where x represents a number satisfying $0.5 \leq x \leq 1.5$,
    a concentration of the specific substance falling within the range of 0.003 mol % to 0.03 mol %.

2. A radiation image detector as defined in claim 1 wherein the intermediate layer has a layer thickness falling within the range of 2 μm to 20 μm.

3. A radiation image detector as defined in claim 1 wherein a hole blocking layer is located between the intermediate layer and the electrode, which is located on the side at the positive electric potential.

4. A radiation image detector as defined in claim 3 wherein a crystallization preventing layer is located between the intermediate layer and the hole blocking layer.

5. A radiation image detector as defined in claim 2 wherein a hole blocking layer is located between the intermediate layer and the electrode, which is located on the side at the positive electric potential.

6. A radiation image detector as defined in claim 5 wherein a crystallization preventing layer is located between the intermediate layer and the hole blocking layer.

* * * * *